United States Patent [19]

Glatti et al.

[11] 4,154,892

[45] May 15, 1979

[54] ELECTRIC CABLES HAVING A SHEATHING COMPRISING A PLASTICIZED VINYLCHLORIDE POLYMER

[75] Inventors: Flaviano Glatti, Mestre; Gastone Slongo, Mogliano Veneto, both of Italy

[73] Assignee: Montedison S.p.A., Milan, Italy

[21] Appl. No.: 824,217

[22] Filed: Aug. 12, 1977

Related U.S. Application Data

[62] Division of Ser. No. 566,630, Apr. 8, 1975, Pat. No. 4,058,471.

[30] Foreign Application Priority Data

Apr. 9, 1974 [IT] Italy .............................. 21065 A/74

[51] Int. Cl.$^2$ ......................... B32B 15/00; H01B 7/00
[52] U.S. Cl. ............................ 428/372; 174/110 SR; 174/110 V; 428/375; 428/379; 428/389; 260/42.21; 260/42.49

[58] Field of Search ............... 428/375, 379, 383, 389, 428/372; 174/110 V, 110 SR; 252/63.5

[56] References Cited

U.S. PATENT DOCUMENTS

| | | | |
|---|---|---|---|
| 2,426,413 | 8/1947 | Pollett | 428/373 |
| 3,930,419 | 1/1976 | Kramer | 428/375 |

*Primary Examiner*—Lorraine T. Kendall

[57] ABSTRACT

Plasticized polymeric compositions based on vinyl chloride polymers and particularly useful as sheathings for electric cables and for similar applications are disclosed. The compositions contain very small amounts, from 0.05 to 3.0 parts, preferably from 0.05 to 1.0 part by weight of $SiO_2$, very small amounts, from 0.0005 to 1.0 preferably from 0.001 to 0.5 part by weight of a phenol-type antioxidant, and optionally but not necessarily small amounts, from 0.5 to 4.0 parts, preferably from 0.05 to 2.0 parts, by weight of oxides and/or hydroxides of magnesium, aluminum, zinc and alkaline earth metals.

8 Claims, No Drawings

ELECTRIC CABLES HAVING A SHEATHING COMPRISING A PLASTICIZED VINYLCHLORIDE POLYMER

This is a division, of application Ser. No. 566,630, filed Apr. 8, 1975, now U.S. Pat. No. 4,058,471.

THE PRIOR ART

It is known that, in preparing plasticized polymeric compositions based on vinyl chloride polymers for use as sheathings for electric cables and other similar applications, it is possible to include conventional plasticizers such as, for example, phthalates of linear alcohols which cannot affect, or can negatively affect the electric characteristics of the compositions. It is also possible to use particular types of plasticizers selected in dependence on the operating temperature to which the cables will be subjected, such as trimellitates, pyromellitates, triallylcyanurates, and non-linear, even high molecular weight, pthalates which do have a positive influence on the electric characteristics of the composition.

When phthalates of linear alcohols are used, it is necessary, to obtain compositions having satisfactory electric insulating properties, to use substantial amounts of particular mineral fillers such as silica, kaolin, calcium carbonate, calcium, barium and magnesium oxides or the like. While the mineral fillers present in substantial quantity exert a positive influence on the electric insulating properties of the compositions, they simultaneously cause deterioration of the physical-mechanical properties in general and in particular of the plasticity of the compositions at low temperatures, for example cold-bending. In some cases, the mineral fillers present in substantial amount also exert an adverse influence on the processability of the compositions, that is the processing and transformation thereof into cables. In any case, the mineral fillers present in substantial amount increase the specific weight of the compositions which, according to certain standards, e.g., GOST 5960/72, must be below given values.

The special types of plasticizers, such as the trimellitates, etc., mentioned above, are considerably more expensive than the conventional plasticizers, i.e., the phthalates of linear or branched low molecular weight alcohols. Use of the special plasticizers increases the cost of the compositions.

THE PRESENT INVENTION

An object of this invention is to provide new and improved plasticized compositions based on vinyl chloride polymers which have good physical and physical-mechanical properties, particularly useful as sheathings for electric cables and for other similar applications, and not prohibitively expensive.

This and other objects are achieved by the invention in accordance with which the improved compositions are characterized in that they contain silica in very small amounts of from 0.05 to 3.0 parts, preferably from 0.05 to 1.0 part, by weight. In addition to the very small amount of silica, the compositions of the invention also contain very small amounts, from 0.0005 to 1.0 preferably from 0.001 to 0.5, part by weight of a phenol type-antioxidant and, optionally but not necessarily, small amounts, from 0.5 to 4.0 parts, preferably from 0.005 to 2.0 parts, by weight, of oxides and/or hydroxides of Mg, Al, Zn and alkaline-earth metals.

In addition, the compositions of the invention comprise conventional plasticizers selected in dependence on the physical-mechanical properties desired for the composition and on the operating temperature to which the insulated cables or other similar articles made from the composition will be subjected in practice, stabilizers, and other adjuvants for vinyl chloride polymers. Thus, the compositions comprise, per 100 parts of the vinyl chloride polymer,

- 20 to 100 parts by weight of vinyl chloride polymer plasticizers;
- 0.1 to 10 parts by weight of vinyl chloride polymer stabilizers to light and/or heat;
- 0 to 10 parts by weight of vinyl chloride polymer co-stabilizers;
- 0 to 1.0 parts by weight of vinyl chloride polymer ultra-violet ray absorbers;
- 0.05 to 4.0 parts by weight of vinyl chloride polymer lubricants;
- 0 to 10 parts by weight of $TiO_2$ and/or carbon black;
- 0 to 100 parts by weight of vinyl chloride polymer mineral fillers;

and, in accordance with this invention

- from 0.05 to 3.0 parts, preferably from 0.05 to 1.0 part, by weight, of $SiO_2$;
- from 0.0005 to 1.0, preferably from 0.001 to 0.5 part by weight of a phenol-type antioxidant for vinyl chloride polymers and, optionally but not necessarily,

- from 0.5 to 4.0, preferably from 0.05 to 2.0 parts by weight of oxides and/or hydroxides of Mg, Al, Zn and alkaline-earth metals, which may be added to the vinyl chloride polymer even during the polymerization reaction.

Surprisingly, the compositions according to invention, although containing little amounts of inorganic additives ($SiO_2$ alone or in admixture with CaO or the like) exhibit, at the same time, electric, physical-mechanical and chemical characteristics which are better, on the average, than those of analogous compositions prepared according to the prior art and therefore containing high percentages of $SiO_2$ or other similar additives derived from $SiO_2$, such as kaolin and the like, which enhance the electric characteristics and, in consequence, large amounts of plasticizers for compensating for the deterioration of the physical-mechanical properties (in particular the plasticity at low temperatures) resulting from the high concentration of the above-mentioned inorganic additives present.

More particularly, the compositions according to this invention, containing the very small amounts of $SiO_2$, exhibit the following combination of characteristics:

- high initial values, for each temperature range, of the electrical characteristics (insulation constant);
- retention, in the long run, of the initial values of the electrical characteristics, even for cables remaining in contact with water for long periods of time;
- a substantial reduction in, or absence of, color changes even in the presence of CaO, or the like, in amounts up to 1.0 to 1.5 parts by weight;
- retention, in the long run of the high values of the electrical characteristics even in the presence of additives, such as fillers, lubricants, etc. which normally badly affect the electrical characteristics of plasticized compositions based on vinyl chloride polymers;

and

- good plasticity at low temperatures even when, to meet particular standards (GOST 5960/72), large amounts of plasticizers must be avoided.

Furthermore, can be noted that the use of $SiO_2$ alone in the very small amounts in which it is used in accordance with this invention, would bring about a substantial improvement in the electrical characteristics which, however, in the long run would normally be subjected to a deterioration particularly substantial in the case of manufactured articles, e.g., insulating sheathing for electric cables, that in use remain in contact with water for long periods of time. Amounts of $SiO_2$ higher than those used in accordance with the invention would cause a considerable reduction in the plasticity of the compositions at low temperatures which would result in practical difficulties during manufacture of articles starting with the compositions.

The use of calcium oxide (or of other similar oxides or hydroxides) alone and in amounts according to the present invention, would enhance, to a limited but lasting extent, the electrical characteristics of the composition independently of the environmental conditions. Contemporaneously, however, and to increasing extent with increase in the amount of calcium oxide used, the following substantial disadvantages would be encountered:

a rapid reduction in the processability of the composition;

the occurrence of visible chromatic phenomena; and;

a substantial, progressive deterioration of the plasticity at low temperatures of the articles manufactured from the composition.

The use of the phenolic antioxidant alone would probably result in a limited improvement in the electrical characteristics. Used alone in the limited amount according to this invention it would enhance the resistance to oxidation, with a reduction of chromatic phenomena; used alone in higher amounts, it would cause coloring and, in consequent, a possible deterioration of the electrical characteristics.

The vinyl chloride polymer plasticizers to be used according to the present invention can be selected from a wide range of products well known to those skilled in the Art.

Particularly good results are obtained when using one or more products selected from the group consisting of phthalic, adipic, sebacic, trimellitic, pyromellitic, isocianuric and/or azelaic plasticizers and the like.

The vinyl chloride polymer stabilizers to light and/or heat to be used according to the present invention can be selected from a wide range of products well known to those skilled in the art.

Particularly good results are obtained when using lead salts and/or soaps or organometallic compounds of calcium, barium, zinc, cadmium, magnesium, tin and the like.

The vinyl chloride polymer stabilizers to light and/a heat may be used in admixture with vinyl chloride polymer co-stabilizers of a type also well known to those skilled in the art.

To this regard, very good results are obtained when using organic phosphite and epoxy type compounds.

The vinyl chloride polymer ultra-violet ray absorbers to be used according to this invention can be selected from a wide range of products well known to those skilled in the art; particularly good results are obtained when using derivatives of benzo-phenone or benzotriazole, optionally in admixture with optical blueing agents of conventional type.

The vinyl chloride polymer lubricants to be used according to this invention can be selected from a wide range of products well known to those skilled in the art; particularly good results are obtained when using at least one compound selected from the group consisting of stearic acid, stearates of mono- and divalent metals, natural, polyolefinic and/or polyamide waxes, montanic acid derivatives, and the like.

The vinyl chloride polymer mineral fillers to be used according to this invention can be selected from a wide range of products well known to those skilled in the art; particularly good results are obtained when using one or more products selected from the group consisting of calcium carbonate, magnesium carbonate alkaline and alkaline-earth silicates alumina and the like.

The silica used in preparing the present compositions may be selected from a wide range of products. Especially favorable results are attained with flame-micronized silica having an average particle size below 0.01 micron and a surface area preferably larger than 250 $m^2/g$ and, in any case, not smaller than 200 $m^2/g$.

The oxides and/or hydroxides of magnesium, aluminum, zinc and alkaline-earth metals which can be included in the present compositions can also be selected from a wide range of products. Very good results are achieved using calcium or magnesium hydroxide in the form of a powder having an average particle size below 10 microns.

The phenolic antioxidants which are used in these compositions can be selected from a wide range of products. Particularly favorable results are achieved with derivatives of alkylated phenols, bis-phenols, polyphenols and other analagous compounds.

Likewise, the vinyl chloride polymers on which the present compositions are based can be selected from a wide range of homopolymers and copolymers of vinyl chloride. Excellent results are attained with homopolymers obtained by the polymerization of vinyl chloride in an aqueous suspension, and with copolymers of vinyl chloride and other monomers copolymerizable with it, such as, for example, vinyl acetate; after-chlorinated polymers and copolymers of vinyl chloride; highly crystalline vinyl chloride polymers obtained by polymerizing the monomer at low temperature and/or in the presence of particular catalyst systems. When after-chlorinated vinyl chloride polymers, or highly crystalline vinyl chloride polymers are employed, their processability can be improved by using them in admixture with other polymeric materials such as, for example, low molecular weight acrylic polymers.

A presently preferred class of vinyl chloride polymers consists of vinyl chloride homopolymers obtained by polimerization of vinyl chloride, having a K value above 40, preferably comprised between 70 and 100, and the particles of which have diameters ranging from 30 to 150 microns.

The method of preparing the present compositions involving adding, mixing and treating the various components is conventional, as is the manufacture of electric cables having an insulating sheathing of the compositions or other analogous articles.

The following examples are given to illustrate the invention in more detail and are not intended to be limiting.

EXAMPLE 1

Following the modalities specified hereinbelow, insulations for electrical cables were prepared starting from plasticized compositions based on vinyl chloride polymers of the type specified hereinafter. To this purpose, all the solid components of the mixture were introduced at room temperature into a helical blade slow mixer, wherein they were preheated to a temperature of 60° C.

The phenolic antioxidant was dissolved in the plasticizer, which was subsequently slowly sprayed into the mixture. The temperature was brought to and maintained at 90° C. for about 20 minutes. After cooling down to 40° C., the plasticized mixture was discharged from the mixer and then transformed by extrusion into copper cable having a 1.8 mm thickness and provided with a 2.4 mm thick insulation of plastic material (1.8 × 4.2 mm).

A Bandera extruder having a 45 mm diameter, a single-threaded screw, 20 diameters, equipped with a head for extruding a cable on a copper core was used.

The extrusion conditions were the following:

| head temperature | 155° C. |
| body temperature | 135° C. |
| compression ratio | 1:4 |
| screw r.p.m. | 60 |

On cable sections thus prepared, having a 5-meter length, insulation constant KI, expressed in MΩkm, was determined both at 20° C. and 70° C. according to standard GOST 5960/72. An equipment of the KEITHLEY INSTRUMENTS type was used: electrification of 500 V × 1 minute, feeder of the 240 HIGH VOLTAGE SUPPLY type and ammeter of the 602 SOLID STATE ELECTROMETER type.

The components of the compositions under test were the following:
(a) Polyvinyl chloride (PVC): homopolymer of the vinyl chloride prepared by polymerization in aqueous solution, with a K value of about 70 of the type marketed under the trade mark SICRON 548 (MONTECATINI EDISON S.p.A.);
(b) plasticizer: 2-ethyl-hexyl phthalate;
(c) light and heat stabilizer: mixture of tribasic lead sulphate and basic lead phosphite;
(d) lubricant: polyethylene wax of the type marketed as PA 520 by HOECHST G. I.;
(e) silica: Aerosil 380 produced by DEGUSSA AG. with a surface area of 380 m²/g ± 15% and average particle sizes of 0.006–0.01 microns.
(f) calcium oxide: CaO produced by ITALCEMENTI;
(g) phenolic antioxidant: product marketed under the trade name IRGANOX 1076 by CIBA-GEIGY.

Qualitative and quantitative compositions, electrical, physical-mechanical and color characteristics of the electrical insulation cables prepared from the mixtures under test according to the modalities specified hereinbefore are reported in the following Table I.

TABLE I

| MIXTURE COMPOSITION | No. of tests | 1 | 2 | 3 | 4 |
|---|---|---|---|---|---|
| PVC | (parts by weight) | 100 | 99.5 | 98.18 | 98.25 |
| Plasticizer | | 46 | 46 | 46 | 46 |
| Heat and light stabilizer | | 3 | 3 | 3 | 3 |
| Lubricant | | 0.25 | 0.25 | 0.25 | 0.25 |
| SiO$_2$ | | — | 0.5 | 0.5 | 0.5 |
| CaO | | — | — | 1 | 0.25 |
| Phenolic antioxidant (in respect of plasticizer) | | — | 0.0092 | 0.0092 | 0.0092 |
| ELECTRICAL CHARACTERISTICS (GOST 5960/72) | | | | | |
| KI in MΩKm (1) at 70° C. | | 3.0 | 9.0 | 8.0 | 6.0 |
| KI in MΩKm (2) at 20° C. | | 3400 | 4200 | 4700 | 4000 |
| KI in MΩKm (3) at 70° C. | | 2.5 | 8.0 | 6.5 | 5 |
| KI in MΩKm (4) at 20° C. | | 2800 | 3900 | 4400 | 3700 |
| KI in MΩKm (5) at 70° C. | | 2.4 | 2.6 | 11.3 | 6 |
| COLOR | | | | | |
| initial | | white | white | light yellow | white |
| after 14 days in water at 70° C. | | white | white | light yellow | white |
| PHYSICAL-MECHANICAL PROPERTIES (GOST 5960/72) | | | | | |
| Tensile strength kg/mm² | | 1.9 | 1.9 | 1.9 | 1.9 |
| Elongation at break % | | 270 | 270 | 270 | 270 |
| Fracture temperature ° C. | | −42 | −42 | −40 | −41 |

FOOTNOTES TO TABLE 1
(1) Insulation constant KI was determined on a cable immersed for 1 hour in a water bath thermoregulated at 70° C., and then subjected to measuring.
(2) KI-determination on a cable immersed for 24 hours in a water bath thermoregulated at 20° C., and then subjected to measuring.
(3) KI-determination on a cable aged in air for 14 days at 20° C. and then immersed in a water bath at 70° C. for 1 hour and finally subjected to measuring.
(4) KI-determination as for (3); in this case, however, the water bath temperature was 20° C. and the residence time of the cable in the bath was 24 hours.
(5) KI-determination on a cable kept in a water bath at 70° C. for 14 days and then subjected to measuring.

In all cases (1 to 5) the cable was placed in the thermoregulated water bath 24 hours after extrusion; during such 24 hours period the cable was left in the air.

From an examination of the data reported in Table I, it is apparent that the compositions according to this invention have several excellent electrical and physical-mechanical characteristics and are substantially free from coloring phenomena. In particular it can be noticed that the presence of the silica and of the phenolic antioxidant (test 2 — to be compared with test 1 given as reference) results in considerable improvement KI at 20° and 70° C., both for non-aged cables (from 3 to 9 and from 3400 to 4200 MΩkm) and for cables aged in the air for 14 days (from 2.5 to 8 and from 2800 to 3900 MΩkm) without any change in color.

From a comparison of tests 3 and 4, on the one hand, with test 1, on the other, it can be noticed how the presence of calcium oxide, added to silica and to the phenolic antioxidant permits a substantial increase in the KI value at 20° C. and 70° C. not only for cables as such and aged for 14 days, but also for those kept 14 days in a water bath at 70° C., without causing any color change.

EXAMPLE 2

Example 1 was repeated, but starting from mixtures containing, besides the above-mentioned additives, also 60 parts by weight (per 100 parts by weight of PVC) of CaCO$_3$ as an inert filler.

Furthermore, the thermal stabilizer consisted, in one case, of lead tribasic sulphate and in the other case of a mixture made up of calcium and zinc soaps and of an anti-oxygen compound (co-stabilizer) commercially known under the trade name MARK 33, manufactured by ARGUS CHEM. CO., USA. The lubricant was a polyethylene wax of a type identical with that used in Example 1.

Qualitative and quantitative compositions, electrical, physical-mechanical and color characteristics of electrical insulation cables prepared from the mixture under test according to the procedure described in Example 1 are reported in Table II.

5 and 6) and when stabilizers based on Ca and Zn soaps (Mark 33 — Argus Chem. Co.) are employed.

In particular, it can be observed that the use of $SiO_2$, either alone or in admixture with CaO, results in a considerable increase in the KI value at 20° C. and 70° C. (tests 2 and 3 compared with test 1; tests 5 and 6 compared with test 4), without substantially modifying the mechanical properties.

EXAMPLE 3

Following the procedure of Example 1, polymeric compositions suited to the insulation of electrical cables were prepared starting from compounds containing

TABLE II

| MIXTURE COMPOSITION | Test number | 1 | 2 | 3 | 4 | 5 | 6 |
|---|---|---|---|---|---|---|---|
| PVC (1) | (parts by weight) | 100 | 100 | 100 | 100 | 100 | 100 |
| Plasticizer (1) | | 50 | 50 | 50 | 50 | 50 | 50 |
| Thermal stablizer | | | | | | | |
| tribasic lead sulphate | | — | — | — | 6 | 6 | 6 |
| Ca—Zn compound | | 2 | 2 | 2 | — | — | — |
| Lubricant (1) | | 0.5 | 0.5 | 0.5 | 0.5 | 0.5 | 0.5 |
| $CaCO_3$ | | 60 | 60 | 60 | 60 | 60 | 60 |
| $SiO_2$ (1) | | — | 1 | 1 | — | 1 | 1 |
| CaO (1) | | — | — | 0.5 | — | — | 0.5 |
| Phenolic antioxidant (1) (with respect to plasticizer) | | 0.01 | 0.01 | 0.01 | 0.01 | 0.01 | 0.01 |
| ELECTRICAL CHARACTERISTICS (2) (CEI/R 20/11) | | | | | | | |
| KI in MΩkm at 70° C. × 2 h | | 0.1 | 1.5 | 3.4 | 0.9 | 2 | 5 |
| KI in MΩkm at 20° C. × 24 h | | 65 | 600 | 2000 | 900 | 1500 | 3000 |
| COLOR | | | | | | | |
| initial | | white | white | white | white | white | white |
| after 14 days | | white | white | white | white | white | white |
| MECHANICAL CHARACTERISTICS (3) (CEI/R 20/11) | | | | | | | |
| Tensile strength (kg/mm$^2$) | | 1.60 | 1.60 | 1.60 | 1.60 | 1.60 | 1.60 |
| Elongation at break (%) | | 270 | 270 | 270 | 270 | 270 | 270 |
| Cold bending | | positive | positive | positive | positive | positive | positive |

FOOTNOTES TO TABLE II
(1) Products of the same type as those described in Example I were used.
(2), (3) Measurements were carried out according to standard CEI/R 20/11.

From an examination of the data reported in Table II, it is apparent that the compositions according to the present invention (tests 2, 3, 5 and 6, tests 1 and 4 being for comparison) are capable of leading to cables for electrical insulation, which strictly meet the limits fixed by standards CEI/R 20/11 (KI at 20° C. × 24 h ≧ 200 MΩkm and KI at 70° C. × 2 h ≧ 0.183 MΩkm) both when stabilizers based on lead basic salts are used (tests MgO instead of CaO, and from mixtures in which substances of various chemical composition (PA wax and lead dibasic stearate) and compounds of substantially identical composition (commercially available calcium stearates) were used as a lubricants.

The following Tablle III shows the compositions of the mixtures employed, as well as the electrical, physical-mechanical and color characteristics attained with insulated electrical cables prepared from the above indicated mixtures.

TABLE III

| MIXTURE COMPOSITION | Test number | 1 | 2 | 3 | 4 | 5 | 6 | 7 | 8 | 9 | 10 | 11 |
|---|---|---|---|---|---|---|---|---|---|---|---|---|
| | (parts by weight) | | | | | | | | | | | |
| PVC | | 100 | 100 | 100 | 100 | 100 | 100 | 100 | 100 | 100 | 100 | 100 |
| Plasticizer (1) | | 46 | 46 | 46 | 46 | 46 | 46 | 46 | 46 | 46 | 46 | 46 |
| Thermal stabilizer (1) | | 3 | 3 | 3 | 3 | 3 | 3 | 3 | 3 | 3 | 3 | 3 |
| Lubricant (see notes) (3) | | 0.25 | * | * | ** | ** | *** | *** | **** | **** | ***** | ***** |
| | | | 0.25 | 0.25 | 0.5 | 0.5 | 0.5 | 0.5 | 0.5 | 0.5 | 0.5 | 0.5 |
| $TiO_2$ | | 1 | 1 | 1 | 1 | 1 | 1 | 1 | 1 | 1 | 1 | 1 |
| $SiO_2$ (1) | | — | 0.5 | 0.5 | — | 0.5 | — | 0.5 | — | 0.5 | — | 0.5 |
| MgO (2) | | — | — | 0.25 | — | — | — | — | — | — | — | — |
| CaO (1) | | — | 0.25 | — | — | 0.25 | — | 0.25 | — | 0.25 | — | 0.25 |
| Phenolic antioxidant (1) with respect to plasticizer | | — | 0.01 | 0.01 | — | 0.01 | — | 0.01 | — | 0.01 | — | 0.01 |
| ELECTRICAL CHARACTERISTICS (4) (GOST 5960/72) | | | | | | | | | | | | |
| KI in M km at 70° C. | | 3 | 6 | 5 | 1.4 | 4 | 0.6 | 2 | 1.4 | 4 | 1.5 | 3.5 |
| KI in M km at 20° C. | | 3400 | 4000 | 3800 | 1600 | 3200 | 500 | 2400 | 1600 | 3100 | 1500 | 2500 |
| KI in M km at 70° C. (see notes) | | 2.5 | 5 | 4.5 | 1.1 | 3.5 | 0.5 | 1.8 | 1.1 | 3.5 | 1.3 | 3.2 |
| KI in M km at 20° C. to Table I) | | 2800 | 3700 | 3400 | 1400 | 3000 | 450 | 2000 | 1400 | 3000 | 1200 | 2500 |
| KI in M km at 70° C. | | 2.4 | 6 | 5 | 1.3 | 4 | 0.5 | 2 | 1.5 | 4 | 1.5 | 3.5 |
| COLOR | | | | | | | | | | | | |
| Initial | | white | white | white | white | white | white | white | white | white | yellow | yellow |
| After 14 days in water at 70° C. | | white | white | white | white | white | white | white | white | white | yellow | yellow |
| PHYSICAL-MECHANICAL CHARACTERISTICS (GOST 5960/72) | | | | | | | | | | | | |
| Tensile strength $kg/mm^2$ | | 1.9 | 1.9 | 1.9 | 1.9 | 1.9 | 1.9 | 1.9 | 1.9 | 1.9 | 1.9 | 1.9 |
| Elongation at break % | | 270 | 270 | 270 | 270 | 270 | 270 | 270 | 270 | 270 | 270 | 270 |
| Fracture temperature ° C. | | −42 | −41 | −41 | −41 | −41 | −41 | −41 | −41 | −41 | −41 | −41 |

FOOTNOTES TO TABLE III
(1) Products of the same type as those described in Example 1.
(2) Pure reagent.
(3) Products commercially known as lubricants, of different composition and purity degree, and capable, in consequence, of differently affecting the KI value of the mixtures in which they are contained.
* Was PA 520, manufactured by HOECHST;
from  to ** commercially available calcium stearates of different degrees of purity
***** lead dibasic stearate.
(4) See Footnotes (1) to (5) to Table I.

Test 1 is reported for comparison with tests 2 and 3; tests 4, 6, 8 and 10 are reported for comparison with tests 5, 7, 9 and 11 respectively.

From an examination of the data of Table III, it clearly results that when operating according to this invention, it is possible to obtain plasticized polymeric compositions based on PVC, containing very small amounts of inorganic additives ($SiO_2$ + CaO or MgO), which always exhibit a combination of excellent electrical and physical-mechanical characteristics, even though containing different types of lubricants.

More particularly, $SiO_2$, phenolic antioxidant and calcium or magnesium oxide (always present in a total amount far below 1% by weight with respect to PVC) exert a wholly positive influence independently of the lubricant type.

As regards the coloring phenomena, it can be observed that they are entirely absent when use is made of wax PA and of the various calcium stearates, while in the case of lead stearate, the color is present from the beginning and is due to the particular type of lubricant used (lead dibasic stearate) in the amount employed.

EXAMPLE 4

Following the modalities of Example 1, polymer compositions suitable for use as insulation for electrical cables were prepared starting from mixtures containing:

polyvinyl chloride (PVC): homopolymer of vinyl chloride prepared by polymerization in aqueous suspension, having a K value of about 90, produced by MONTECATINI EDISON S.p.A.; plasticizer: mixture of trimellitic esters of linear alcohols $C_8$–$C_{10}$;

heat and light stabilizers: mixture of tribasic lead sulphate and basic lead phosphite;

lubricants: mixture of tribasic lead stearate and OP wax (HOECHST).

The other products employed were the same as described in Example 1.

The compositions of the mixtures employed as well as the electrical, physical-mechanical and color characteristics obtained with electrical cables provided with insulation based on the above mentioned mixtures are reported in following Table IV.

possible to obtain plasticized PVC-based compositions exhibiting excellent electrical and physical-mechanical properties though containing very small amounts of inorganic additives.

With regard to CaO, and as seen from a comparison of the data of tests 2 and 3 with those of test 1 (given for comparison), the effect of the CaO on the electrical characteristics appears to depend on whether the CaO is added during the polymerizing of the vinyl chloride or after completion of the polymerization reaction. This can be readily inferred from the fact that, when the CaO was added during the polymerization reaction, it was more effective in enhancing the electrical characteristics of the final plasticized composition that when it was added after completion of the polymerization; although, regardless of whether the CaO was added during or after the polymerization, there was a substantial increase in the electrical characteristics of the final compositions as compared to the electrical characteristics of the comparison tests, the compositions of which contained neither $SiO_2$ nor CaO.

EXAMPLE 5

Example 1 was repeated but using different components in the polymeric blends.

To this regard, four blends were prepared having the following composition.

| Test No. | | 1 | 2 | 3 | 4 |
|---|---|---|---|---|---|
| PVC (1) | parts by | 100 | 100 | — | — |
| PVC (2) | weight | — | — | 100 | 100 |
| Plasticizer (3) | | 30 | 30 | — | — |
| Plasticizer (4) | | — | — | 45 | 45 |
| Stabilizer (5) | | 4.5 | 4.5 | — | — |
| Stabilizer (6) | | — | — | 6 | 6 |
| Lubricant (7) | | 0.5 | 0.5 | — | — |
| Lubricant (8) | | — | — | 1 | 1 |
| Dye (9) | | 0.7 | 0.7 | — | — |
| Antioxidant (10) | | 0.3 | 0.3 | — | — |
| Antioxidant (11) | | — | — | 0.01 | 0.01 |
| $SiO_2$ (12) | | — | 1 | — | 0.5 |

TABLE IV

| COMPOSITION OF THE MIXTURE | Test number | 1 | 2 | 3 |
|---|---|---|---|---|
| PVC | (parts by weight) | 100 | 100 | 100 |
| Plasticizer | | 55 | 55 | 55 |
| Heat and light stablizers | | 3 | 3 | 3 |
| Lubricant | | 1 | 1 | 1 |
| $SiO_2$ | | — | 1 | 1 |
| CaO | | — | 0.35* | 0.35** |
| Phenolic antioxidant (with respect to plasticizer) | | — | 0.01 | 0.1 |
| ELECTRICAL CHARACTERISTICS (GOST-5960/72) | | | | |
| KI in M km at 70° C. | | 0.7 | 5 | 4 |
| KI in M km at 20° C. | | 400 | 2000 | 1600 |
| KI in M km at 70° C. (see remarks | | 0.4 | 2 | 1.8 |
| KI in M km at 20° C. to Table I) | | 500 | 3000 | 2000 |
| COLOR | | | | |
| initial | | | | |
| after 14 days in water at 70° C. | | no color change is observed after the tests | | |
| PHYSICAL-MECHANICAL CHARACTERISTICS (GOST 5960/72) | | | | |
| Tensile strength (kg/mm²) | | 220 | 220 | 220 |
| Elongation at break % | | 350 | 350 | 350 |
| Fracture temperature ° C. | | −55 | −55 | −55 |

*added during the polymer preparation cycle
**added after the polymer preparation From an examination of Table IV is apparent that even with plasticizers other than the phthalates, it is -continued

| Test No. | 1 | 2 | 3 | 4 |
|---|---|---|---|---|
| CaCO$_3$ | — | — | 5 | 5 |

NOTES
Tests 1 and 3 are given as comparison to Tests 2 and 4
(1) Homopolymer of vinyl chloride prepared through aqueous polymerization with a K value of about 80, commercially known as SICRON 575 (trade mark of Montedison S.p.A.)
(2) Homopolymer of vinyl chloride prepared through aqueous suspension polymerization with a K value of 70, commercially known as SICRON 548 (trade mark of Montedison S.p.A.)
(3) Dioctyl sebacate
(4) Diisodecyl phthalate
(5) Mixture of basic lead phthalate and basic lead phosphite
(6) Mixture of basic lead sulfate and basic lead phosphite
(7) Mixture of lead stearate and polyethylenic wax, commercially known as PA 520 (manufactured by Farbwerke Hoechst)
(8) Mixture of stearic acid and calcium stearate
(9) Blue phthalociamide
(10) bis-phenol A
(11) Phenolic antioxidant of the type commercially known as IRGANOX 1076, trade mark of CIBA-GEIGY
(12) Silica of the type known as AEROSIL 380, manufactured by DEGUSSA A.G.

The following table V summarizes the electrical properties and the fracture temperature of the cables for electrical insulation prepared from the blends under examinations in accordance with the procedure given in example 1.

TABLE V

| Test No. | 1 | 2 | 3 | 4 |
|---|---|---|---|---|
| ELECTRICAL PROPERTIES | | | | |
| VR: at 20° C. (1) ohm cm | 5.8 × 10$^{13}$ | 17 × 10$^{13}$ | — | — |
| VR: at 70° C. (1) ohm cm | 1 × 10$^{11}$ | 5 × 10$^{11}$ | — | — |
| KI: at 20° C. × 24hrs. (2) ohm km | — | — | 3400 | 4300 |
| KI: at 70° C. × 2 hrs. (2) ohm cm | — | — | 1.5 | 3 |
| Fracture temperature ° C. | −52 | −50 | −28 | −27 |

(1) Determined in accordance with the standards CEI 20/11R of flat specimens obtained by compression molding (170° C., 2 minutes, 100 atm), sizes (127 × 127 × 1 mm)
(2) See notes to table I From the data of table V, it becomes evident that polymeric blends containing other plasticizers, different from dioctylphthalate, other stabilizers, based on mixtures of stearic acid and calcium stearate, and other antioxidants different from IRGANOX 1076, when transformed into cable insulations are characterized by good electrical and physico-mechanical (fracture temperature) properties, even if they contain very small amounts of SiO$_2$.

More particularly, after a comparison between tests 1 and 2, and tests 3 and 4, it is clear that the introduction of 1 or 0.5 p.b.w. of SiO$_2$ in combination with small amounts of antioxidants (bis-phenyl A or IRGANOX 1076) does actually improve the electrical properties (at 20° C. and 70° C.) of the thus obtained insulated cables.

EXAMPLE 6

To prove the great influence of SiO$_2$, even in very small amounts, on the electrical properties of the cable insulations based on PVC, five blends were prepared having the following compositions

| | Test No. | 1 | 2 | 3 | 4 | 5 |
|---|---|---|---|---|---|---|
| PVC (1) | parts | 100 | 100 | 100 | 100 | 100 |
| Plasticizer (2) | by | 50 | 50 | 50 | 50 | 50 |
| Stabilizer (3) | weight | 3 | 3 | 3 | 3 | 3 |
| Lubricant (4) | | 1 | 1 | 1 | 1 | 1 |
| SiO$_2$ (5) | | — | — | — | 0.5 | 0.5 |
| CaCO$_3$ | | — | 15 | 15 | 15 | — |
| Kaolin (6) | | 15 | — | — | — | — |
| Antioxidant (7) | | — | — | 0.1 | 0.1 | 0.1 |

Test 1–3 are given for comparison
(1) See example 1
(2) See example 1
(3) See example 1
(4) Stearic acid
(5) See example 1
(6) Clay 33 manufactured by Clay Chem. Co, USA
(7) See example 1

The following table VI summarizes the electrical properties, the fracture temperature and the dynamic thermal stability of the cables for electrical insulation prepared from the blends under examination in accordance with the procedure given in example 1.

TABLE VI

| Test No. | 1 | 2 | 3 | 4 | 5 |
|---|---|---|---|---|---|
| ELECTRICAL PROPERTIES | | | | | |
| KI: at 20° C. × 24hrs. (1) M ohm km | 3100 | 1000 | 1400 | 4500 | 4800 |
| KI: at 70° C. × 2hrs. (1) M ohm km | 2.6 | 1 | 1.3 | 3.8 | 4 |
| THERMAL DYNAMIC STABILITY | | | | | |
| HCl formation (2) minutes | 30 | 30 | 50 | 50 | 50 |
| Fracture temperature ° C. | −35 | −35 | −35 | −35 | −43 |

(1) See notes to table II
(2) Determined according to standards VDE 02H

From the date of table VI it is clear that 15 parts by weight of kaolin (a well known additive for improving KI) lead to an insulation with electrical properties (KI at 20° C. and 70° C.) still lower than that of test 5 (according to the invention) which contains only 0.5 parts by weight of SiO$_2$ in combination with 0.1 parts by weight of a phenolic antioxidant (cfr. tests 1 and 5). When using CaCO$_3$, alone or in admixture with an antioxidant (cfr. test 4 with tests 2 and 3), in order to meet the standards GOST 5960/72, it is necessary to use, in accordance with our invention, also 0.5 parts by weight of SiO$_2$.

EXAMPLE 7

To prove the great influence of SiO$_2$, even in very small amounts, on the electrical properties of cable insulations containing different type of barium/cadmium stabilizers, some blends were prepared, the qualiquantitative compositions and the electrical properties of insulations obtained therefrom are given in the following tabe VII.

TABLE VII

| Test No. | 1 | 2 | 3 | 4 | 5 | 6 | 7 | 8 | 9 | 10 | 11 |
|---|---|---|---|---|---|---|---|---|---|---|---|
| PVC[1] | 100 | 100 | 100 | 100 | 100 | 100 | 100 | 100 | 100 | 100 | 100 |
| Plasticizer[2] | 50 | 50 | 50 | 50 | 50 | 50 | 50 | 50 | 50 | 50 | 50 |
| Ba/Cd stabilizer | | | | | | | | | | | |
| (3 a) | — | 1 | 1 | — | — | — | — | — | — | — | — |
| (3 b) | — | — | — | 1 | 1 | — | — | — | — | — | — |
| (3 c) | — | — | — | — | — | 1 | 1 | — | — | — | — |
| (3 d) | — | — | — | — | — | — | — | 1 | 1 | — | — |
| (3 e) | — | — | — | — | — | — | — | — | — | 1 | 1 |
| $SiO_2$[4] | — | — | 0.5 | — | 0.5 | — | 0.5 | — | 0.5 | — | 0.5 |
| Antioxidant[5] | 0.15 | 0.15 | 0.15 | 0.15 | 0.15 | 0.15 | 0.15 | 0.15 | 0.15 | 0.15 | 0.15 |
| Lubricant[6] | 0.5 | 0.5 | 0.5 | 0.5 | 0.5 | 0.5 | 0.5 | 0.5 | 0.5 | 0.5 | 0.5 |
| ELECTRICAL PROPERTIES VR: at 70° C.[7] ohm cm | $2.3 \times 10^{11}$[8] | $11 \times 10^{10}$ | $33 \times 10^{10}$ | $3.8 \times 10^{10}$ | $9 \times 10^{10}$ | $24 \times 10^{10}$ | $60 \times 10^{10}$ | $46 \times 10^{10}$ | $80 \times 10^{10}$ | $25 \times 10^{10}$ | $60 \times 10^{10}$ |

Test 1,2,4,6,8 and 10 are given only for comparison
NOTES TO TABLE VII
[1] SICRON 548 FM
[2] di-2-ethyl-hexyl phthalate
[3] Different type of barium/cadmium organic stabilizer commercially known as MARK WSX (a), MARK 99 (b), MARK WSX EDA (c), MARK WSX EDB (d) and MARK WSX OHM (e), trade mark of ARGUS CHEM. CO., ISA.
[4] AEROSIL 380
[5] bis-phenol A
[6] stearic acid
[7] See notes to table II
[8] A remarkable formation of HCl was noticed From the above data, it is clear that $SiO_2$ in the amounts according to the invention is actually capable to exert a noticeable influence on the electrical properties (VR at 70° C. for instance) of insulations based on PVC compositions containing different type of barium/cadmium stabilizers.

EXAMPLE 8

To prove the great influence of $SiO_2$, even in very small amounts, on the electrical properties of cable insulations containing carbon black, three blends were prepared, the quali-quantitative composition and the properties of insulations obtained there from are given in the following table VIII

TABLE VIII

| Test No. | 1 | 2 | 3 |
|---|---|---|---|
| PVC (1) | 100 | 100 | 100 |
| Plasticizer (2) | 50 | 50 | 50 |
| Stablizer (3) | 5 | 5 | 5 |
| $CaCO_3$ | 40 | 40 | 40 |
| Carbon-black (4) | — | 2 | 2 |
| $SiO_2$ (5) | — | — | 0.4 |
| Lubricant (6) | 0.5 | 0.5 | 0.5 |
| ELECTRICAL PROPERTIES | | | |
| KI at 60° C. × 2 hrs (7) M ohm Km | 3 | 1.8 | 3.6 |
| LIGHT STABILITY | | | |
| 2000 hrs. Weather-O-Meter | degraded | unaltered | unaltered |

Tests 1 and 2 are given for comparison.
NOTES TO TABLE VII
(1) SICRON 548 FM
(2) Mixture of di-2-ethyl hexyl phthalate and di-isodecylphthalate
(3) Mixture of basic lead phthalate and basic lead phosphite
(4) A product commercially known as MONARK 81, trade mark of DEGUSSA AG.
(5) Aerosil 380
(6) Stearic acid
(7) Determined in accordance with the standards CEI 20/11 R on molded specimens of the type described in example 5
(8) No antioxidant was used in these tests.

From the data of Table VIII, it becomes quite evident the strong influence of $SiO_2$ (0.4 parts by weight) also in PVC insulations containing carbon black.

EXAMPLE 9

To provide that the influence of $SiO_2$ does not depend on the kind of stearic acid used as lubricant, four blends were prepared, the quali-quantitative composition and the electrical properties of insulations obtained there from are given in the following table IX.

TABLE IX

| Test No. | 1 | 2 | 3 | 4 |
|---|---|---|---|---|
| PVC (1) | 100 | 100 | 100 | 100 |
| Plasticizer (2) | 50 | 50 | 50 | 50 |
| Stabilizer (3) | 2 | 2 | 2 | 2 |
| Lubricant (4) a | 1 | — | 1 | — |
| Lubricant (4) b | — | 1 | — | 1 |
| Antioxidant (5) | — | — | 0.01 | 0.01 |
| $SiO_2$ (6) | — | — | 0.5 | 0.5 |
| ELECTRICAL PROPERTIES | | | | |
| KI at 70° C. × 1 hr M ohm × Km (7) | $3 \times 10^{11}$ | $5.4 \times 10^{11}$ | $12 \times 10^{11}$ | $14 \times 10^{11}$ |

Tests 1 and 2 are given for comparison
NOTES TO TABLE IX
(1) SICRON 548 FM
(2) di-2-ethylhexylphthalate
(3) Mixture of basic lead sulfate and basic lead phosphite
(4) Stearic acid of the type commercially known as S/4 and RG/2 manufactured by SIMEL S.p.A. Italy and having the following composition

| | 4a | 4b |
|---|---|---|
| Myristic acid ($C_{14}$) | 3 | 5 |
| Palmitic acid ($C_{16}$) | 25 | 30 |
| Stearic acid ($C_{18}$) | 67 | 64 |
| Oleic acid ($C_{18}$) | 5 | 1 |

(5) bis-phenol A
(6) Aerosil 380, manufactured by Degussa AG.
(7) Determined in accordance with the standards CEI 20/11 R on molded specimens of the type described in example 5.

From the data of Table IX, it becomes quite clear that the strong influence of $SiO_2$, in combination with an antioxidant, does not depend on the type of stearic acid used as lubricant.

EXAMPLE 10

To prove that the kind of $SiO_2$ does actually exert a great influence on the electrical properties of PVC cable insulations, four blends were prepared, the quali-quantitative compositions and the electrical properties of insulations obtained there from are given in the following table X.

TABLE X

| Test No. | 1 | 2 | 3 | 4 |
|---|---|---|---|---|
| PVC (1) | 100 | 100 | 100 | 100 |
| Plasticizer (2) | 46 | 46 | 46 | 46 |
| Stabilizer (3) | 3 | 3 | 3 | 3 |
| Lubricant (4) | 0.5 | 0.5 | 0.5 | 0.5 |
| Antioxidant (5) | 0.01 | 0.01 | 0.01 | 0.01 |
| $SiO_2$ (6) | | | | |
| a | 1 | — | — | — |
| b | — | 1 | — | — |
| c | — | — | 1 | — |
| d | — | — | — | 1 |
| ELECTRICAL PROPERTIES | | | | |
| KI: at 20° C. × 24hrs (7) M ohm km | 1500 | 3000 | 3000 | 2500 |
| KI: at 70° C. × 1hrs (7) M ohm km | 1.1 | 4.1 | 3.9 | 2.5 |

(1) (2) (3) (5) and (4) See notes to Table I
(4) Mixture of basic lead stearate and polyethylenic wax PA 520.
(6) Different type of $SiO_2$
 a Micronized $SiO_2$ with average particle sizes greater than 1 micron
 b Aerosil 380
 c CAB-O-SIL EH5, manufactured by Cabot Corp. USA, with a surface area of about 390 $m^2/g$ and average particle sizes of about 0.007 micron
 d CAB-O-SIL n 7D, manufactured by Cabot Corp. USA, with a surface area of about 200 $m^2/g$ and average particle sizes of about 0.014 micron.

As it is clearly evident from the data of tests 1–4 when using $SiO_2$ of the types 6 (a) and (d) with average particle sizes and/or surface area respectively above 0.01 micron (6a) and below 250$m^2/g$ (6d), cable insulations are obtained with electrical properties by far lower than those of cable insulations containing $SiO_2$ with average particle sizes and surface area (6b) and 6 (c), well in accordance with what stated in the description, and thus below 0.01 micron and above 250 $m^2/g$, (see tests 2 and 3 in comparison with tests 1 and 4).

EXAMPLE 11

To prove that CaO may be replaced by either MgO or ZnO, still having cable insulations with acceptable electrical properties, four blends were prepared the quali-quantitative compositions and the electrical properties of insulations therefrom obtained are given in the following Table XI.

TABLE XI

| Test No. | 1 | 2 | 3 |
|---|---|---|---|
| PVC (1) | 100 | 100 | 100 |
| Plasticizer (2) | 46 | 46 | 46 |
| Stabilizer (3) | 3 | 3 | 3 |
| Lubricant (4) | 0.5 | 0.5 | 0.5 |
| Antioxidant (5) | 0.01 | 0.01 | 0.01 |
| $SiO_2$ (6) | 1 | 1 | 1 |
| $TiO_2$ | 1 | 1 | 1 |
| CaO | 0.5 | — | — |
| ZnO | — | 0.5 | — |
| MgO | — | — | 0.5 |
| ELECTRICAL PROPERTIES | | | |
| VR at 20° C. (7) Ohm cm | $4.5 \times 10^{12}$ | $3.8 \times 10^{12}$ | $3.2 \times 10^{12}$ |

(1) (2) (3) (5) and (6): see notes to table I
(4) Mixture of basic lead stearate and polyethylenic wax PA 520
(7) See notes to Table V From the above data, it becomes clear that ZnO and MgO are capable to yield cable insulations endowed with electrical properties, that, even if lower than those of CaO containing insulations, are still good enough.

We claim:

1. Electric cables having, as sheathing, a plasticized polymeric composition the essential constituent of which is a vinylchloride polymer and which also consists of:

(a) from 0.05 to 3.0 parts of silica having an average particle size less than 0.01 micron and a surface area larger than 200 $m^2/g$; and
(b) from 0.0005 to 1.0 part of a phenolic antioxidant for the vinylchloride polymer and selected from the group consisting of derivatives of alkylated phenols, bis-phenols and polyphenols;

said compositions also containing the following constituents in parts per 100 parts of the vinylchloride polymer:

(c) from 20 to 100 parts of a plasticizer for the vinylchloride polymer;
(d) from 0.1 to 10 parts of heat and light stabilizers for the vinylchloride polymer;
(e) from 0 to 10 parts of a costabilizer for the vinylchloride polymer;
(f) from 0 to 1.0 parts of ultra-violet ray absorbers and/or optical blueing agents for the vinyl-chloride polymer;
(g) from 0 to 4.0 parts of a lubricant for the vinylchloride polymer;
(h) from 0 to 10 parts of $TiO_2$ and/or carbon black; and
(i) from 0 to 100 parts of mineral fillers.

2. Electric cables according to claim 1, the sheathing of which contains from 0.05 to 1.0 parts of silica per 100 parts of the vinylchloride polymer.

3. Electric cables according to claim 1, and the sheathing of which contains from 0.05 to 4.0 parts, per 100 parts of the vinylchloride polymer, of oxides and/or hydroxides of magnesium, aluminum, zinc and alkaline earth metals, in the form of powders having an average particle size of less than 10.0 microns.

4. Electric cables according to claim 1, and the sheathing of which contains calcium oxide.

5. Electric cables according to claim 1, and the sheathing of which contains magnesium oxide.

6. Electric cables according to claim 1, and the sheathing of which contains zinc oxide.

7. Electric cables according to claim 1, and the sheathing of which contains, per 100 parts of the vinylchloride polymer, from 0.05 to 1.5 parts of calcium, magnesium or zinc oxide.

8. Electric cables according to claim 1, and the sheathing of which contains, per 100 parts of the vinylchloride polymer, from 0.001 to 0.5 part of a phenolic antioxidant.

* * * * *